(12) United States Patent
Gray et al.

(10) Patent No.: US 12,659,136 B2
(45) Date of Patent: Jun. 16, 2026

(54) OBJECT-LEVEL ENCRYPTION

(71) Applicant: Capital One Services, LLC, McLean, VA (US)

(72) Inventors: Rocky Gray, Fairfax, VA (US); Jeremy Green, Alexandria, VA (US); Justin Bachorik, Silver Spring, MD (US); Irakli Nadareishvili, Wilmington, DE (US)

(73) Assignee: Capital One Services, LLC, McLean, VA (US)

( * ) Notice: Subject to any disclaimer, the term of this patent is extended or adjusted under 35 U.S.C. 154(b) by 17 days.

(21) Appl. No.: 18/582,836

(22) Filed: Feb. 21, 2024

(65) Prior Publication Data

US 2024/0235822 A1     Jul. 11, 2024

Related U.S. Application Data

(63) Continuation of application No. 17/406,660, filed on Aug. 19, 2021, now Pat. No. 11,943,338.

(51) Int. Cl.
    *H04L 9/08*        (2006.01)
    *H04L 9/14*        (2006.01)
          (Continued)

(52) U.S. Cl.
    CPC .......... *H04L 9/0825* (2013.01); *H04L 9/0861* (2013.01); *H04L 9/0894* (2013.01); *H04L 9/14* (2013.01); *H04L 67/1097* (2013.01)

(58) Field of Classification Search
    CPC .............. G06F 21/602; G06F 21/6218; G06F 2221/2107; H04L 67/1097; H04L 63/068;
          (Continued)

(56) References Cited

U.S. PATENT DOCUMENTS

| | | | |
|---|---|---|---|
| 8,015,209 B2 * | 9/2011 | Kassan | .............. G06Q 30/0601 |
| | | | 705/26.1 |
| 9,251,097 B1 * | 2/2016 | Kumar | ................ G06F 11/1076 |

(Continued)

OTHER PUBLICATIONS

Nov. 24, 2022—(WO) International Search Report and Written Opinion—App No. PCT/US2022/040781.

*Primary Examiner* — Mohammad A Siddiqi

(74) *Attorney, Agent, or Firm* — Banner & Witcoff, Ltd.

(57) ABSTRACT

A method, apparatus, system, or computer-readable medium for performing object-level encryption and key rotations is disclosed. A service platform may store data items organized into one or more asset clusters. A first content encryption key may be set as the active encryption key for an asset cluster. The active encryption key may be encrypted using the master encryption key. A first subset of data items may be encrypted using the active encryption key (e.g., the first content encryption key). After the number of data items encrypted using the active encryption key satisfies a threshold value, the first content encryption key may be set as an inactive encryption key and a second content encryption key may be set as the new active encryption key for the asset cluster. A second subset of the plurality of data items may be encrypted using the active encryption key (e.g., the second content encryption key).

17 Claims, 15 Drawing Sheets

(51) Int. Cl.
    *H04L 29/08*            (2006.01)
    *H04L 67/1097*          (2022.01)
(58) Field of Classification Search
    CPC ... H04L 63/065; H04L 9/0825; H04L 9/0894;
            H04L 9/14; H04L 9/0861; H04L 9/0891
    See application file for complete search history.

(56)                   References Cited

U.S. PATENT DOCUMENTS

| | | | |
|---|---|---|---|
| 10,341,304 B1 | 7/2019 | Boutros et al. | |
| 11,943,338 B2 * | 3/2024 | Gray | H04L 9/0861 |
| 2004/0022391 A1 | 2/2004 | O'Brien | |
| 2004/0052379 A1 | 3/2004 | Nishimoto et al. | |
| 2007/0124603 A1 | 5/2007 | Yamamichi et al. | |
| 2008/0219453 A1 * | 9/2008 | Chang | H04L 9/0897 |
| | | | 380/44 |
| 2010/0106646 A1 | 4/2010 | Passeri et al. | |
| 2010/0303241 A1 * | 12/2010 | Breyel | G06F 21/602 |
| | | | 380/29 |
| 2011/0030008 A1 * | 2/2011 | Kang | H04N 21/47 |
| | | | 725/43 |
| 2013/0024689 A1 | 1/2013 | Liu et al. | |
| 2014/0229737 A1 | 8/2014 | Roth et al. | |
| 2015/0026452 A1 | 1/2015 | Roelse | |
| 2015/0381578 A1 * | 12/2015 | Thota | G06F 21/602 |
| | | | 713/168 |
| 2017/0041296 A1 | 2/2017 | Ford et al. | |
| 2017/0076097 A1 | 3/2017 | Ali et al. | |
| 2018/0054302 A1 | 2/2018 | Shveykin et al. | |
| 2018/0287785 A1 | 10/2018 | Pfannenschmidt et al. | |
| 2018/0373600 A1 * | 12/2018 | Xu | G06F 11/1451 |
| 2019/0370790 A1 | 12/2019 | Spector et al. | |
| 2020/0059356 A1 | 2/2020 | Shveykin et al. | |
| 2020/0134223 A1 | 4/2020 | Ye et al. | |
| 2020/0266997 A1 * | 8/2020 | Monica | H04L 9/14 |
| 2020/0267547 A1 * | 8/2020 | Tal | H04B 1/713 |
| 2020/0280434 A1 | 9/2020 | Cioraca | |
| 2020/0394317 A1 | 12/2020 | White et al. | |
| 2021/0224361 A1 | 7/2021 | Veldsman | |
| 2022/0021687 A1 * | 1/2022 | Bhattacharya | H04L 63/1416 |
| 2022/0407689 A1 * | 12/2022 | Jeuk | H04L 9/0643 |
| 2023/0018251 A1 * | 1/2023 | Cosentino | H04L 9/0819 |
| 2023/0031380 A1 * | 2/2023 | Craggs | H04L 9/0891 |

\* cited by examiner

```
INSERT INTO key_counts(key_id, slot, cnt)
    VALUES (${contentEncryptionKeyId}, RAND() * 100, 1)
    ON DUPLICATE KEY UPDATE cnt = cnt + 1;
```

FIG. 11A

```
SELECT key_id, SUM(cnt)
FROM key_counts
WHERE key_id in (${keyIds})
GROUP BY 1
ORDER BY 2 DESC;
```

FIG. 11B

OBJECT-LEVEL ENCRYPTION

This application claims priority to U.S. Patent application Ser. No. 17/406,660, filed Aug. 19, 2021, and entitled "Object-Level Encryption." The prior application is herein incorporated by reference in its entirety for all purposes.

FIELD OF USE

Aspects of the disclosure relate generally to object encryption. More specifically, aspects of the disclosure may provide for enhanced security for objects stored in cloud storage.

BACKGROUND

Modern computing technology utilizes cloud storage services to expand storage capacity and increase security. By storing data in an off-site storage server such as the service offered by Amazon S3® (provided by Amazon.com, Inc. of Seattle, Washington) and others, a service platform may offer flexible storage solutions while maintaining high data integrity. These services typically offer server-side encryption (SSE) to ensure that the stored data is encrypted and thus protected against most types of unauthorized access. However, as past data breach events have demonstrated, when a malicious actor obtains access to an instance with a role that allows access to such cloud storage service, then the request for data access could still result in the transparent decryption of objects.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for object-level encryption and secure key rotation to be used along with server-side encryption on cloud storage. This may have the effect of distributing multiple encryption keys over clusters of objects and minimizing the negative impact in the event of a security breach. According to some aspects, these and other benefits may be achieved by encrypting asset binaries with rotating content encryption keys and storing master cluster keys in external storage. Thus, even in the event that a cloud storage service is compromised, the stored objects would remain encrypted and even if one of the encryption keys is leaked, the scope of the breach could be limited to a handful of objects that were encrypted with the leaked key. Aspects described herein improve the quality, efficiency, and speed of object encryption systems by offering improved security for cloud storage.

In accordance with the disclosed methods, apparatuses, systems, and computer-readable storage medium, a plurality of asset clusters may be stored using a data store. Each asset cluster may comprise a plurality of data items and associated with an active encryption key. For each asset cluster in the plurality of asset clusters, a master encryption key may be generated. A first content encryption key may be generated based on the master encryption key for the asset cluster. The first content encryption key associated with the asset cluster may be set as the active encryption key for the asset cluster. A first subset of the plurality of data items of the asset cluster may be encrypted using the active encryption key. A count of a number of data items encrypted using the active encryption key may be maintained. It may be determined that the number of data items encrypted using the active encryption key exceeds a threshold value. The first content encryption key may be set as an inactive encryption key for the asset cluster. Based on the master encryption key for the asset cluster, a second content encryption key may be generated for the asset cluster. The second content encryption key may be set as the active encryption key for the asset cluster. For a second subset of the plurality of data items in the asset cluster, the second subset of the plurality of data items may be encrypted using the active encryption key. A second count of the number of data items encrypted using the active encryption key may be maintained.

According to some embodiments, each of the first subset of data items for the asset cluster may be decrypted using the inactive encryption key. Each of the first subset of data items for the asset cluster may be encrypted using the active encryption key. The inactive encryption key may be reset, based on decrypting each of the first subset of data items, to a default value. The first content encryption key may be deleted. It may be determined that a threshold time period has elapsed. The second content encryption key may be set as an inactive encryption key for the asset cluster. For the asset cluster and based on the master encryption key for the asset cluster, a third content encryption key may be generated. The third content encryption key may be set as the active encryption key for the asset cluster. Each asset cluster in the plurality of asset clusters may be associated with a third-party service. Each of the master encryption keys may be stored using an external security store and may be inaccessible to any third-party services. The first content encryption key and the second content encryption key may be generated by providing a request indicating an asset cluster in the plurality of asset clusters to the external security store and receiving a response from the external security store. From a computing device, a request for a data item may be obtained. An asset cluster in the plurality of asset clusters storing the data item may be determined. A content encryption key used to encrypt the data item may be determined. The content encryption key may be the first content encryption key for the determined asset cluster and/or the second content encryption key for the determined asset cluster. The data item may be decrypted using the determined content encryption key. The decrypted data item may be transmitted to the computing device. A second master encryption key may be generated for each asset cluster. For each asset cluster in the plurality of asset clusters: the active encryption key for the asset cluster may be decrypted using the master encryption key for the asset cluster, the active encryption key for the asset cluster may be encrypted using the second master encryption key for the asset cluster; the inactive encryption key for the asset cluster may be decrypted using the master encryption key for the asset cluster; and the inactive encryption key for the asset cluster may be encrypted using the second master encryption key for the asset cluster. The master encryption key for each asset cluster may be deleted.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 11A and 11B depict example database queries for updating and retrieving encryption counts in accordance with one or more aspects discussed herein.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for object-level encryption and key rotation. As discussed further herein, this combination of features may allow for increased security and decreased negative impact upon security breach.

Before discussing these concepts in greater detail, however, several examples of a computing device that may be used in implementing and/or otherwise providing various aspects of the disclosure will first be discussed with respect to FIG. 1.

Figure 1:
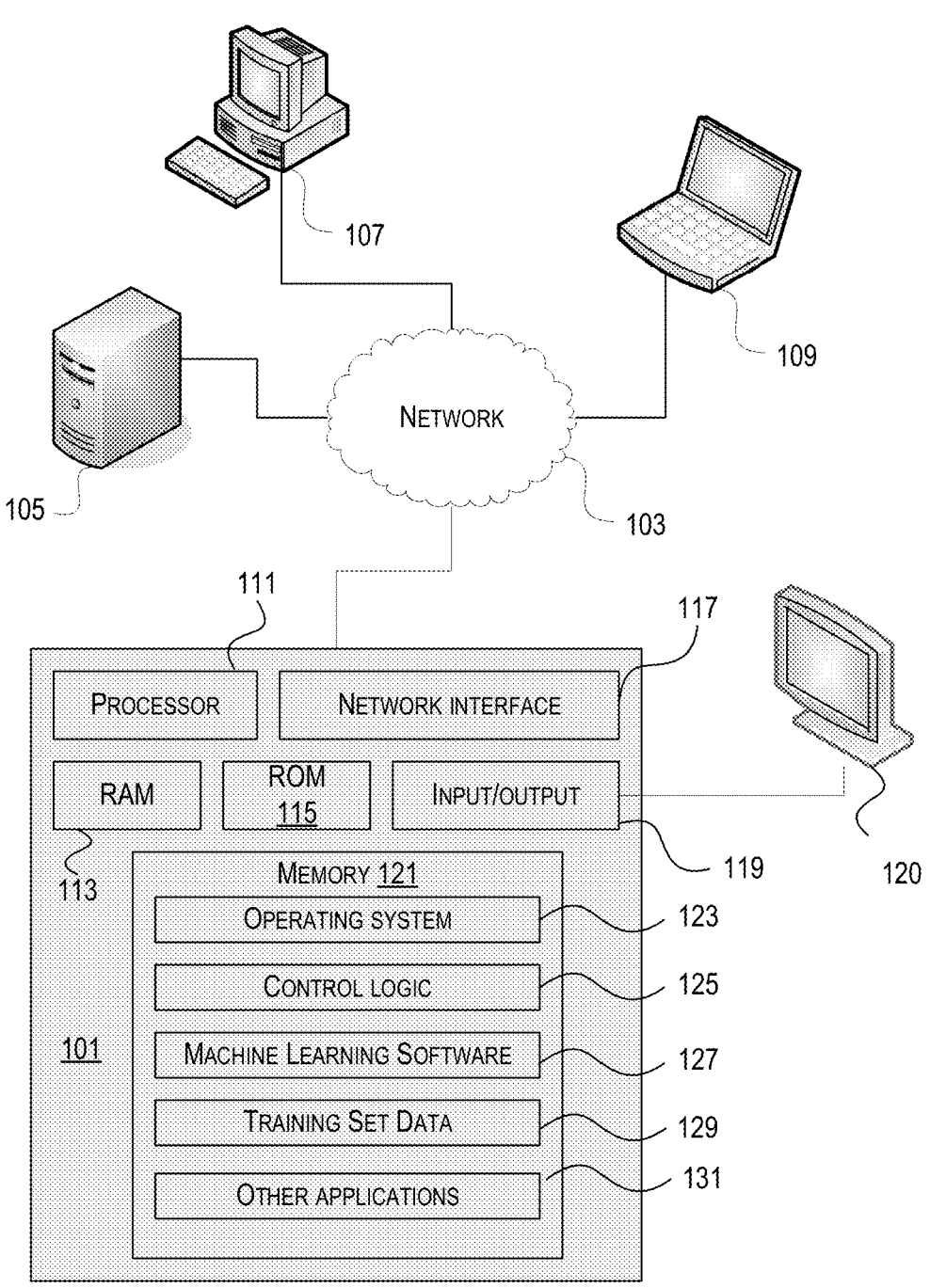
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 129. Control logic 125 may be incorporated in and may be a part of machine learning software 127. In many embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125 and/or software 127.

Having discussed several examples of computing devices which may be used to implement some aspects as discussed further below, discussion will now turn to a method for object layer encryption.

Figure 2:
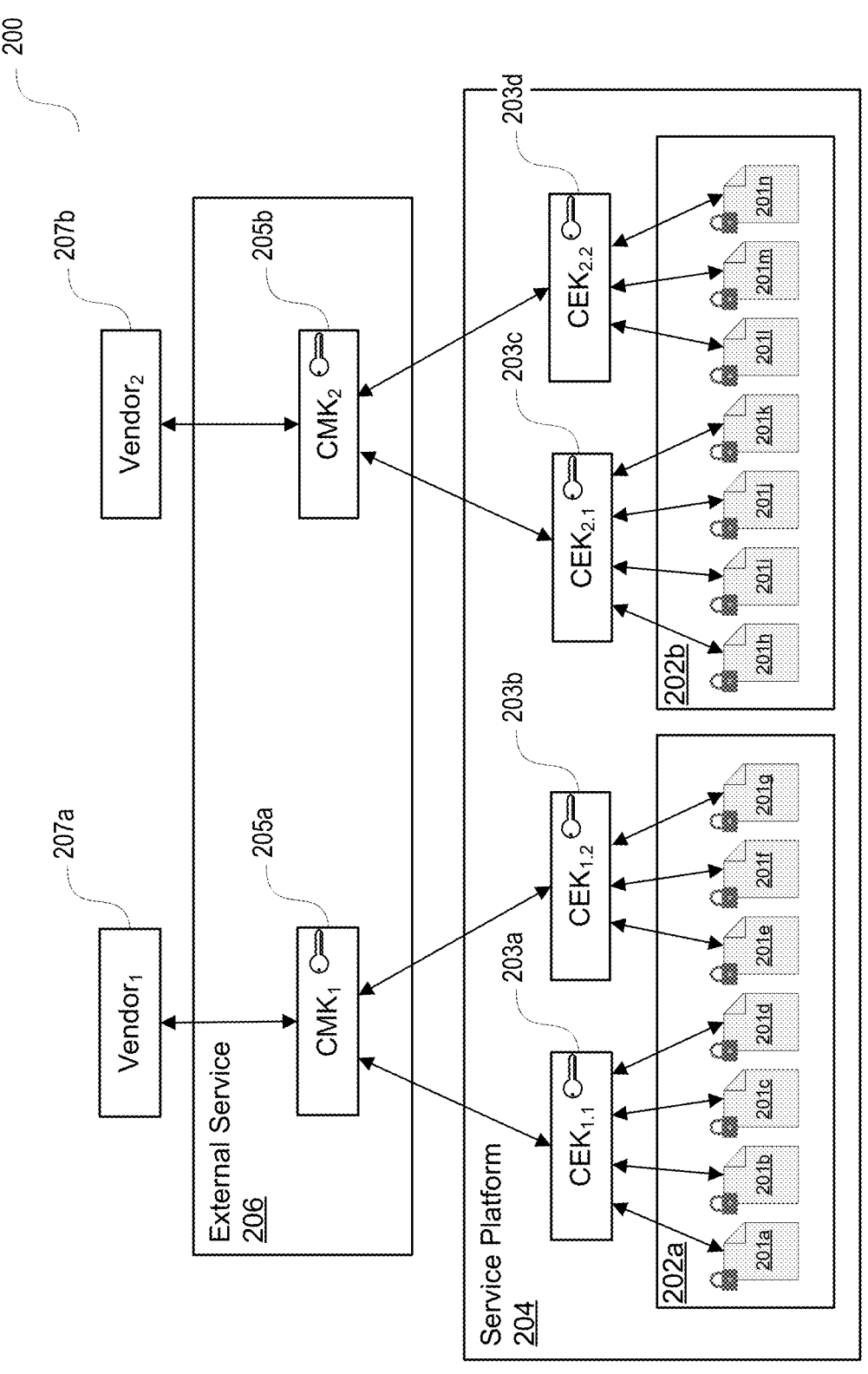
FIG. 2 depicts an example structure for organizing encryption keys in accordance with one or more aspects discussed herein.

FIG. 2 depicts an example structure for organizing encryption keys. An encryption key may be a cryptographic key that is used to digitally encrypt a piece of content such as text, image, audio, video, document, code, etc. or another cryptographic key. A cryptographic key may be randomly generated and be secret (e.g., kept hidden to prevent unauthorized access). A cryptographic key may be symmetric, that is the same encryption key may be used to decrypt the encrypted message. Cryptographic keys may be asymmetric, where two related keys form a pair. In hierarchical key model 200, there may be one or more binary asset binaries 201a-201n (collectively "201"). Asset binary 201 may be variously referred to as an asset, a binary, a file, a document, an object, an item, etc. Asset binaries 201 may be digital data (e.g., text, image, audio, video, etc.) that needs protection. Binary asset binaries 201 may be organized into one or more clusters 202a, 202b (collective "202"). Cluster 202 (also referred to as an "asset cluster") may be a grouping or partition in which asset binaries 201 are organized. For example, asset binaries 201a-201g may belong to cluster 202a while asset binaries 201h-201n may belong to cluster 202b. Each of clusters 202 may represent a partition of data that corresponds to one vendor. The padlock symbol on each of binary asset binaries 201 may represent object-level encryption (OLE). Specifically, asset binaries 201a-n may be encrypted with content encryption keys (CEKs) 203a-203d (collectively "203"). CEK 203 may be an encryption key that is used to digitally encrypt a piece of content. Asset binaries 201 may be encrypted using two or more CEKs. In the example embodiment shown in FIG. 2, asset binaries 201a-201d may be encrypted using $CEK_{1.1}$ 203a, asset binaries 201e-201g may be encrypted using $CEK_{1.2}$ 203b, asset binaries 201h-201k may be encrypted using $CEK_{2.1}$ 203c, and asset binaries 201l-201n may be encrypted using $CEK_{2.2}$ 203d. This way, in the unfortunate event that one of the CEKs 203 gets compromised (e.g., leaked, stolen, cracked, etc.), the integrity of those asset binaries 201 that had been encrypted with the remaining uncompromised CEKs 203 could still remain intact. Asset binaries 202 and CEKs 203 may be part of service platform 204. Service platform 204 may be a web service, cloud storage, app server, social media service, etc.

Each of CEKs 203 may be further encrypted using one of cluster master keys (CMKs) 205a, 205b (collectively "205"). For example, $CEK_{1.1}$ 203a and $CEK_{1.2}$ 203b may be encrypted using $CMK_1$ 205a, and $CEK_{2.1}$ 203c and $CEK_{2.2}$ 203d may be encrypted using $CMK_2$ 205b. CMK 203 may be a cryptographic key that is used to digitally encrypt other cryptographic keys such as CEKs 203 belonging to the same cluster. CMKs 205 may be stored in external service 206. For example, external service 206 may be a cloud storage service that is external to service platform 204. Alternatively, CMKs 205 may be stored within service platform 204. CMKs 205a may correspond to one or more vendors 207a, 207b (collectively "207"). For example, $CMK_1$ 205a may correspond to $vendor_1$ 207a and $CMK_2$ 205b may correspond to $vendor_2$ 207b. CMKs 205 and vendors 207 may have one-to-one mappings with each other. Each cluster 202 may be related to a single CMK 205 and a single vendor 207. Each of vendors 207 may be a service, corporate entity, client, account, customer, etc. Thus, even if a security breach is found for data pertaining to one vendor, the data for other vendor(s) may remain secure and protected. Each vendor 207 may be provisioned with at least one CMKs 205 that will be stored in external service 206. In turn, CEKs 203 may be generated to encrypt asset binaries 202. CEKs 203 may be stored in a database after being encrypted by CMKs 205.

Figure 3:
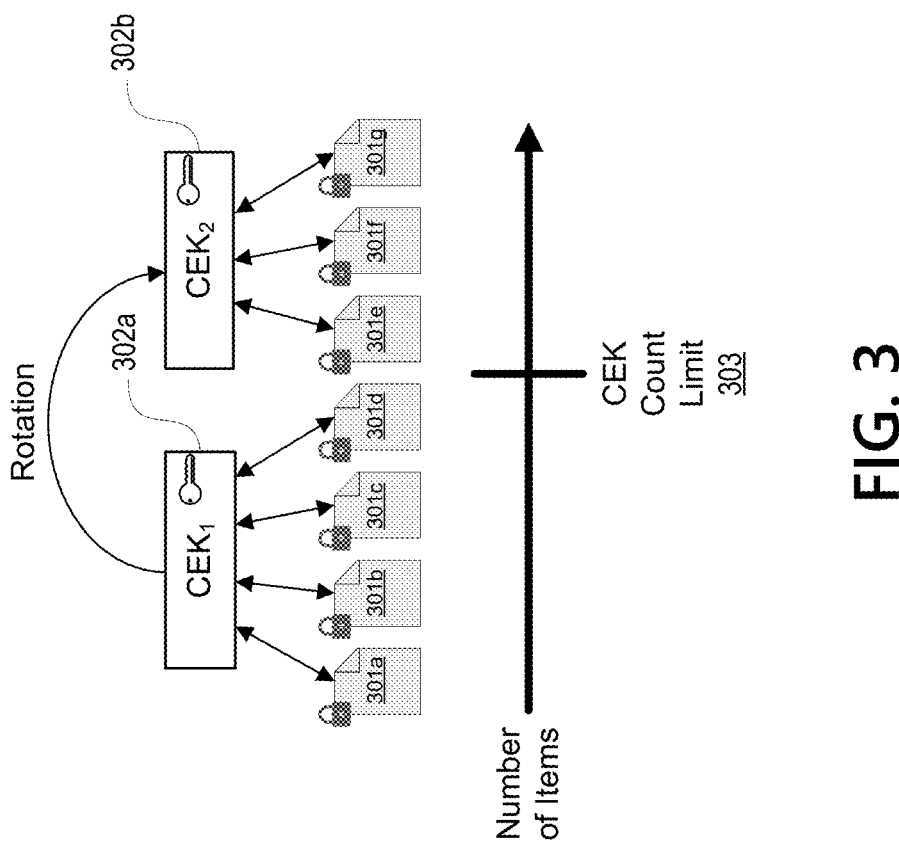
FIG. 3 depicts an example process of content encryption key rotation in accordance with one or more aspects discussed herein.

FIG. 3 depicts an example process of content encryption key rotation. In cluster 300, asset binaries 301a-301g (collectively "301") may be encrypted with one or more CEKs 302a, 302b (collective "302"). Asset binaries 301 and CEKs 302 may correspond to asset binaries 201 and CEKs 202 of FIG. 2. In this example, initially $CEK_1$ 302a may be the "active" CEK (also referred to as the "current" CEK) for cluster 300. In other words, whenever a new binary is to be protected within cluster 300, the binary would be encrypted with $CEK_1$ 302a. However, there may exist a predetermined encryption limit for how many asset binaries 301 may be encrypted per each of CEKs 302. In the example shown in FIG. 3, that CEK count limit 303 is four but the encryption limit could be any number (e.g., 10,000 per CEK). After CEK count limit 303 is reached (i.e., the number of items encrypted using the active CEK is equal to CEK count limit 303), the active CEK may be retired and a new CMK may be created. In the example shown in FIG. 3, after asset binaries 301a-301d are encrypted using active $CEK_1$ 302a and CEK count limit 303 of four is reached, $CEK_1$ 302a may be retired from use (i.e., loses its "active" status) and $CEK_2$ 302b may become the new active CEK. The retired CEK may be also referred to as an inactive CEK, an old CEK, a deprecated CEK, etc. Inactive $CEK_1$ 302a may still be used to decrypt asset binaries 301a-301d, which had been previously encrypted using (then active) $CEK_1$ 302. Subsequent binaries such as asset binaries 301e-g and forward may be protected (e.g., encrypted) with $CEK_2$ 302b, which is the new active CEK of cluster 300. In addition or alternatively, an active CEK may be retired based on a temporal threshold such as a timer. For example, an active CEK of cluster 300 may be retired once CEK count limit 303 is reached or a predetermined timer (e.g., one day, one month, three months, one year, etc.) expires, whichever event occurs first. Although not shown in FIG. 3, $CEK_2$ 302b may eventually be retired and replaced by yet another CEK for encrypting new asset binaries in cluster 300.

Figure 4A:
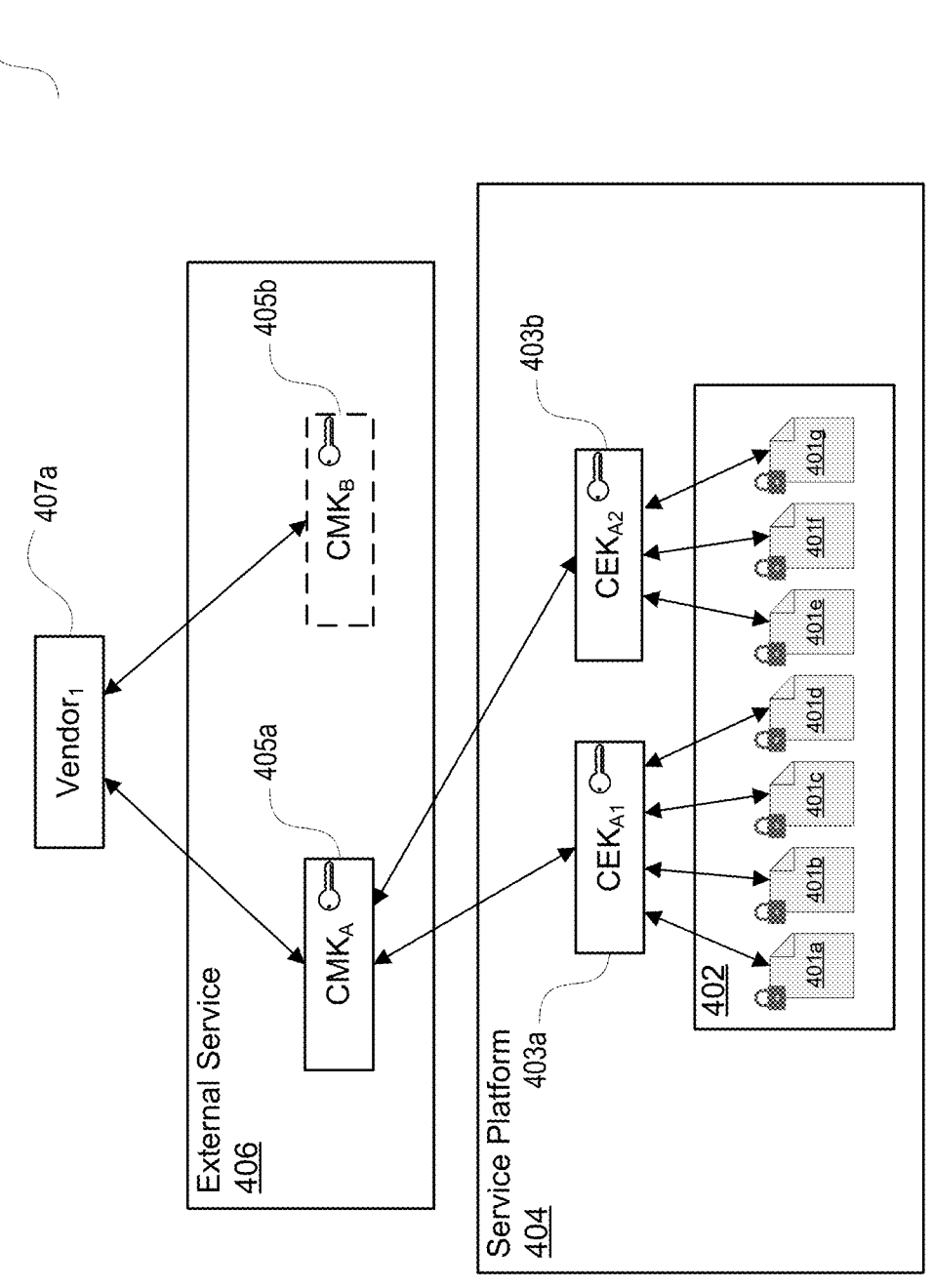
FIGS. 4A-4D depict an example process system of master key rotation in accordance with one or more aspects discussed herein.

FIGS. 4A-4D depict an example process of master key rotation. One or more components of system 400 as depicted in FIGS. 4A-4D may correspond to their respective counterparts in FIGS. 2 and 3, thus their detailed descriptions are omitted here. In the steady state as depicted in FIG. 4A, each cluster may have an active CMK and an inactive CMK. The active CMK may be used to encrypt any new CEKs that are generated. The active CMK may also be referred to as the current CMK. The inactive CMK may also be referred to as the retired CMK, the old CMK, or the deprecated CMK. In this example, asset binaries 401a-401d of cluster 402 may be encrypted using $CEK_{A1}$ 403a, and asset binaries 401e-401g of cluster 402 may be encrypted using $CEK_{A2}$ 403b. $CMK_A$ 405a may be the currently active CMK (represented with a solid line in FIG. 4A) for $vendor_1$ 407a. $CMK_B$ 405b may be an inactive CMK (represented with a broken line in FIG. 4A). Both $CMK_A$ 405a and $CMK_B$ 405b may be stored in external service 406 that is separate from service platform 404 although, alternatively, $CMK_A$ 405a and $CMK_B$ 405b may be stored within service platform 404.

Figure 4B:
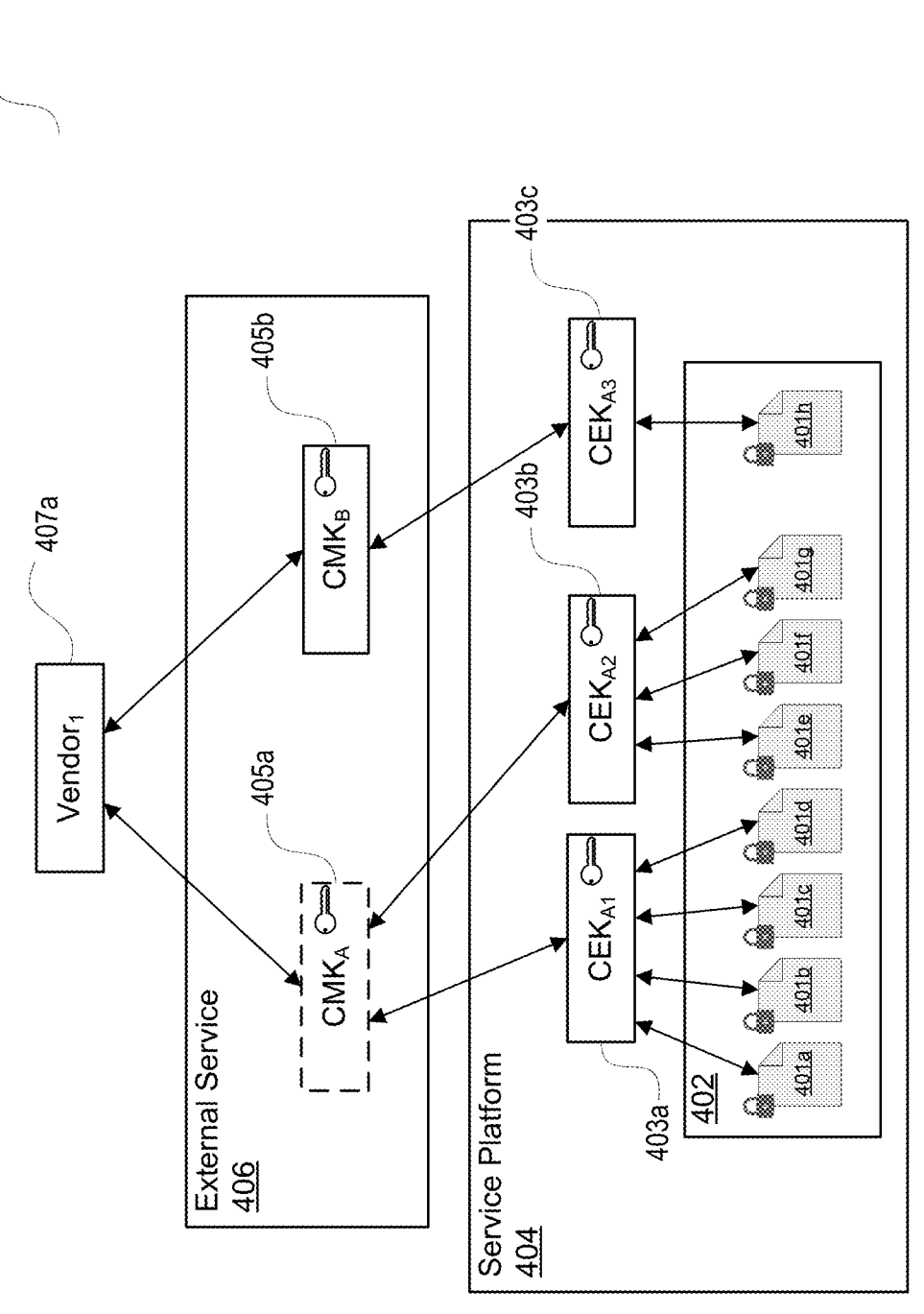

In FIG. 4B, system 400 may begin the CMK rotation. As with the CEK rotation, the CMK rotation may take place when a predetermined encryption limit (e.g., a number of items that may be encrypted with a given encryption key) is reached and/or a timer has expired. When such an event occurs, the status of CMK$_A$ 405a may be toggled from "active" to "inactive" with regard to cluster 402. Likewise, the status of CMK$_B$ 405b may be toggled from "inactive" to "active." The status changes of CMK$_A$ 405a and CMK$_B$ 405b may take place simultaneously (e.g., atomically). Any new CEKs created during the master key rotation process, such as CEK$_{A3}$ 403c in this example, may be encrypted using newly active CMK$_B$ 405b. The CMK count limit of seven in this example is reached when asset binary 401g is encrypted using CEK$_{A2}$ 403b. New CEK$_{A3}$ 403c becomes the new active CEK of cluster 402 and at the same time new CMK$_B$ 405b becomes the new active CMK of cluster 402. Any new asset binaries may be encrypted using active CEK$_{A3}$ 403c for the time being, and CEK$_{A3}$ may be encrypted using CMK$_B$ 405b. Alternatively, unlike what is depicted in FIG. 4B, a CMK rotation may not necessarily coincide with a CEK rotation. For example, a new CMK may be activated while keeping an old CEK as the active CEK.

Figure 4C:
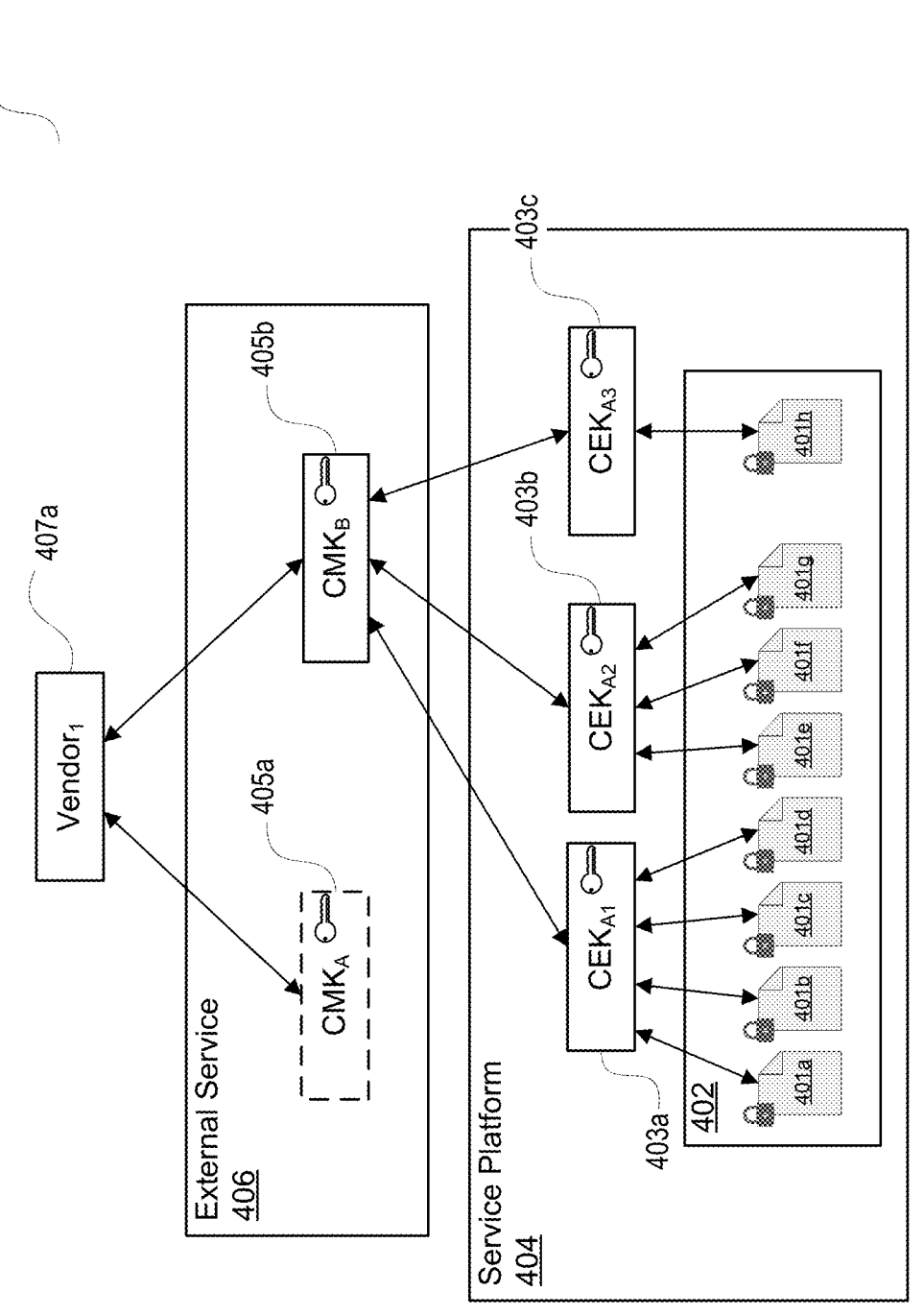

In FIG. 4C, for each of CEKs 403a-403b associated with (now) inactive CMK$_A$ 405a, those CEKs 403a-403b may be decrypted using CMK$_A$ 405a and then re-encrypted with active CMK$_B$ 405b. This way, any CEKs 403 that might have been initially encrypted with any deprecated CMKs may always stay encrypted using one active CMK (e.g., CMK$_B$ 405b).

Figure 4D:
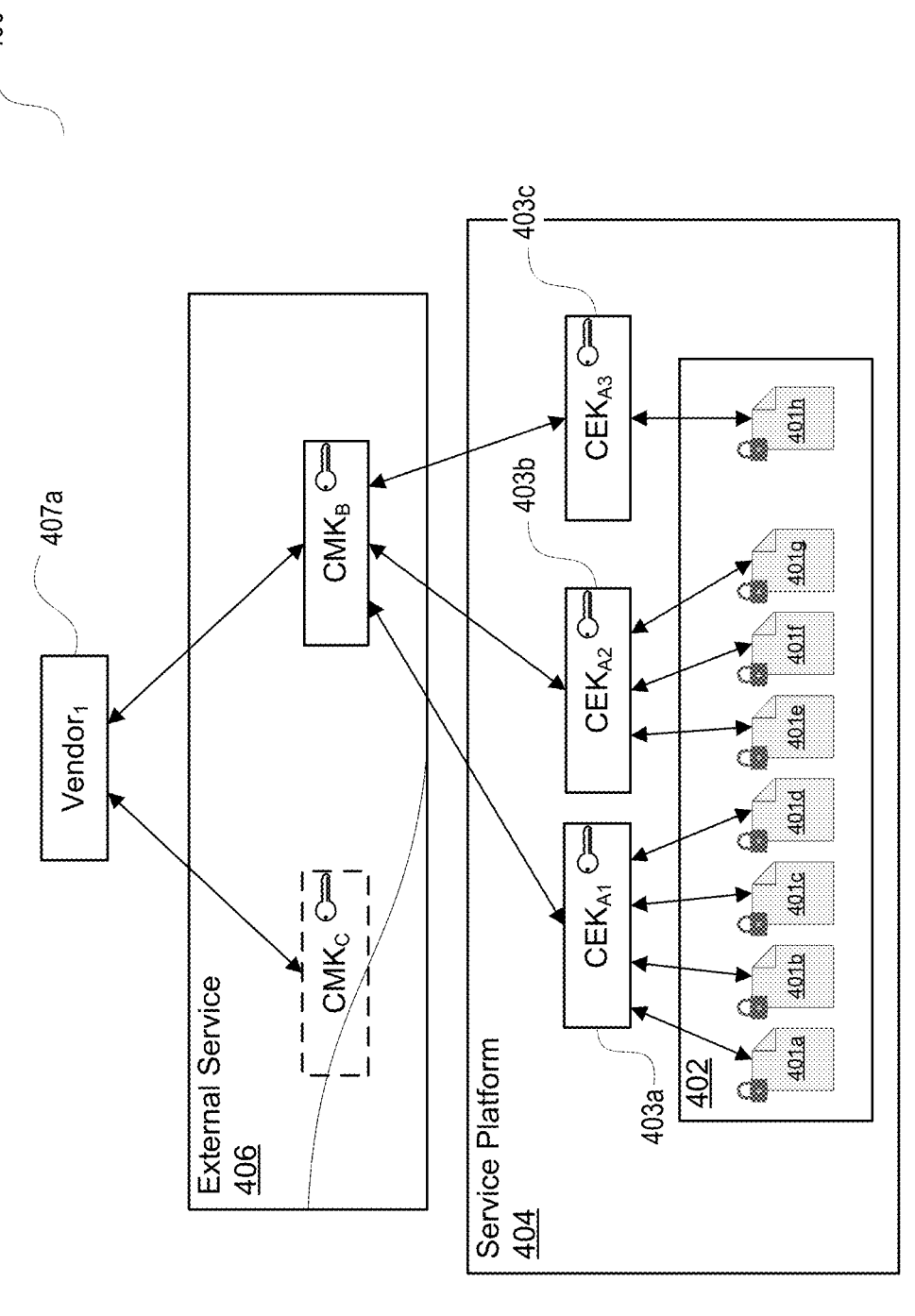

In FIG. 4D, the cycle of CMK rotation may be concluded by retiring old CMK$_A$ 405a after all CEKs 403 have been re-encrypted using currently active CMK$_B$ 405b. Old CMK$_A$ 405a may now be safely deleted from external service 406. Alternatively, CMK$_A$ 405a may not be deleted and stay in external service 406. Either way, once old CMK$_A$ 405a is retired, new CMK$_C$ 405c may be newly generated as the new inactive CMK later to eventually replace currently active CMK$_B$ 405b once its encryption limit and/or lifetime is reached.

Figure 5:
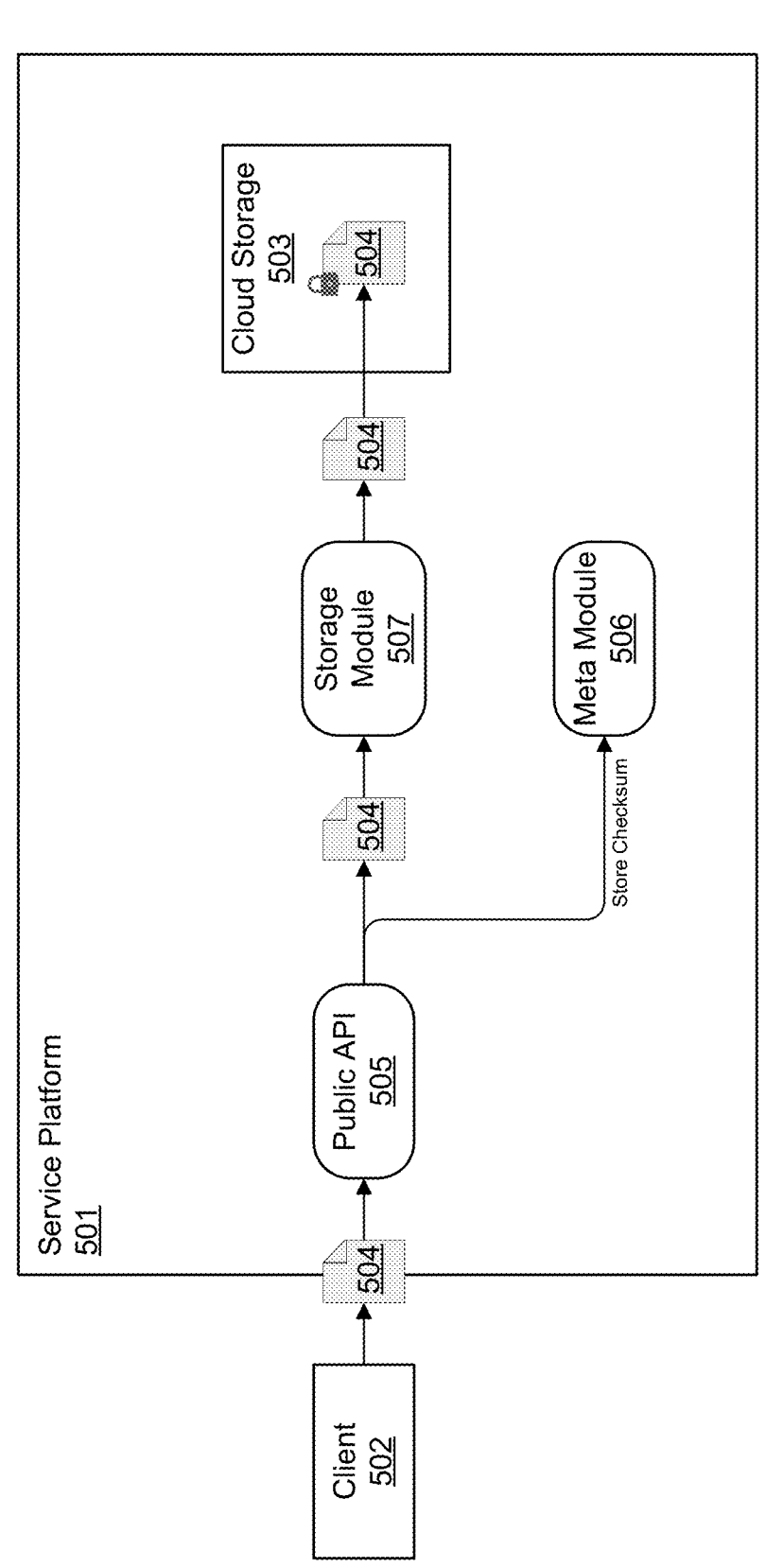
FIG. 5 depicts an example process of performing server-side encryption in accordance with one or more aspects discussed herein.

FIG. 5 depicts an example process of performing server-side encryption. In system 500, service platform 501 may receive one or more asset binaries from client 502 and store those asset binaries in cloud storage 503. Various components shown in FIG. 5 may correspond to respective counterparts as described with reference to FIGS. 2-4D, thus their detailed descriptions are omitted here. Cloud storage 503 may be external object storage such as Amazon S3® provided by Amazon.com, Inc. of Seattle, Washington. Cloud storage 503 may be located outside service platform 501. Service platform 501 may include one or more modules such as public application programming interface (API) 505, metadata module 506, and storage module 507. These modules may be implemented with software, hardware, or a combination of both. For example, these modules may be one of a process, a service, a microservice, a plug-in, a driver, a library, etc. Two or more modules of service platform 501 may be combined into one module. One or more of these modules may be located inside and/or outside service platform 501.

Client 502 may be an application that is capable of interacting with service platform 501 to store and access data. For example, client 502 may be one of network nodes 101, 105, 107, and 109 as depicted in FIG. 1. Client 502 may correspond to a vendor. Client 502 may send asset binary 504 to service platform 501 for storage. For example, client 502 may send asset binary 504 to service platform 501 via public API 505. In particular, public API 505 may offer one or more API commands that client 502 may use for submitting asset binary 504. Public API 505 may use metadata module 506 to generate and store a checksum of asset binary 504. The checksum may be used to ensure the integrity of asset binary 504 and to check whether its content has been altered. Public API 505 may use storage module 507 to store asset binary 504 at cloud storage 503.

Cloud storage 503 may offer server-side encryption (SSE), which protects (e.g., encrypts) documents at rest and prevents attackers from reading their sensitive content in the event they gain unauthorized access. Thus, after cloud storage 503 receives asset binary 504 from service platform 501, cloud storage 504 may first encrypt asset binary 504 via server-side encryption and then store encrypted asset binary 504. SSE may protect documents at rest and prevent attackers from reading sensitive content from disk in the event that the attackers gain access to the infrastructure and/or facilities of cloud storage 503. However, because the API of cloud storage 503 is designed to decrypt the binary transparently for the client, malicious attackers with access to an appropriate access role (e.g., Identity and Access Management (IAM) role on Amazon Web Service® (AWS)) with permission to read from will also be able to read the unencrypted content of binaries.

Figure 6:
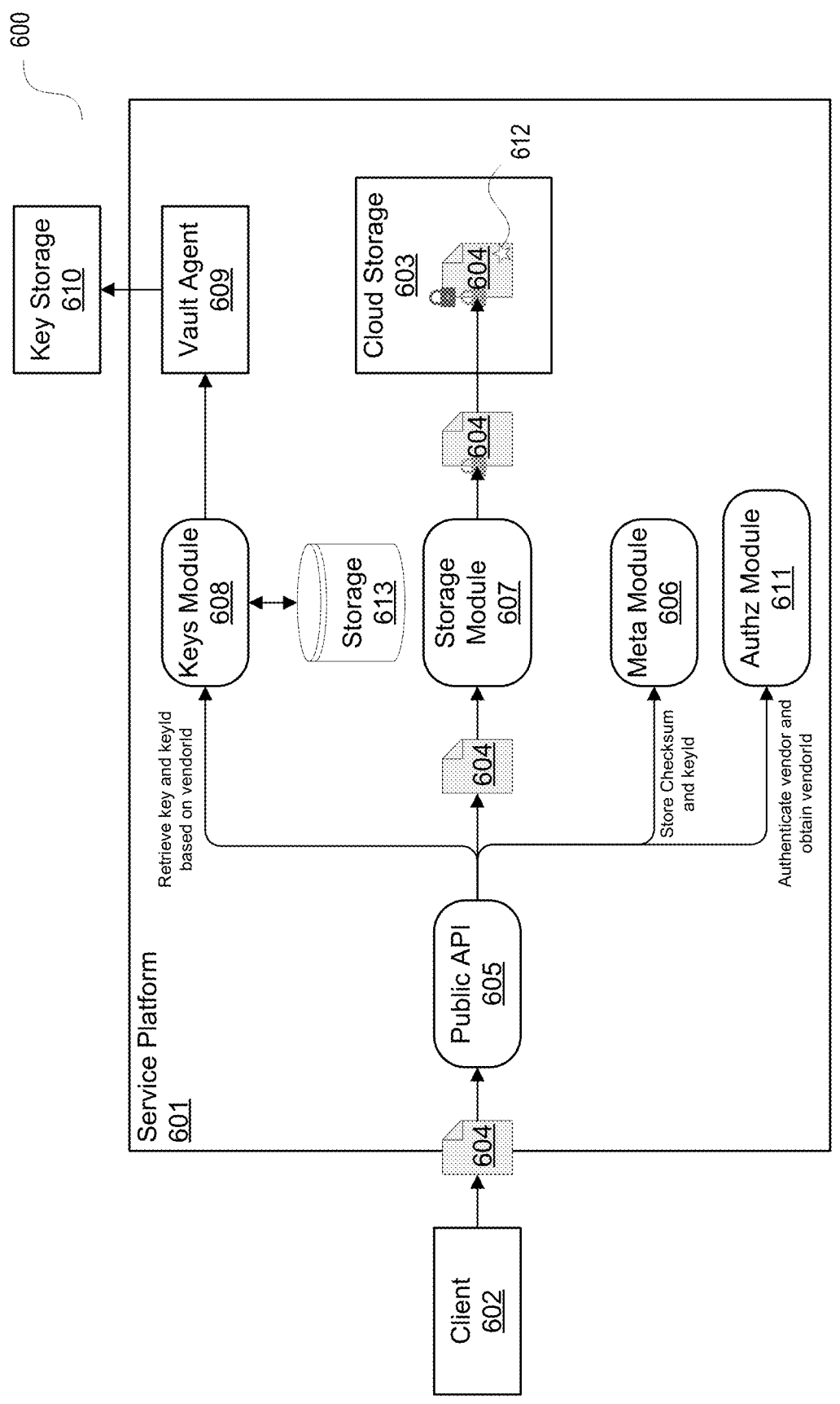
FIG. 6 depicts an example process of performing object-level encryption in accordance with one or more aspects discussed herein.

FIG. 6 depicts an example process of performing object-level encryption. In system 600, service platform 601 may receive one or more asset binaries from client 602 and store those asset binaries in cloud storage 603. Various components shown in FIG. 6 may correspond to respective counterparts as described with reference to FIGS. 2-5, thus their detailed descriptions are omitted here. Service platform 601 may include one or more modules such as public application programing interface (API) 605, metadata module 606, storage module 507, and keys module 608. These modules may be implemented with software, hardware, or a combination of both. For example, these modules may be one of a process, a service, a microservice, a plug-in, a driver, a library, etc. Two or more modules of service platform 601 may be combined into one module. One or more of these modules may be located inside and/or outside service platform 601. Various modules depicted in FIG. 6 may communicate with each other via a web protocol (e.g., hypertext transfer protocol (HTTP)). Through object-level encryption (OLE), service platform 601 may encrypt documents before placing them into cloud storage 603.

Client 602 may be an application that is capable of interacting with service platform 601 to store and access data. For example, client 602 may be one of network nodes 101, 105, 107, and 109 as depicted in FIG. 1 or client 502 as depicted in FIG. 5. Client 602 may correspond to a vendor. Client 602 may send asset binary 604 to service platform 601 for storage. For example, client 602 may send asset binary 604 to service platform 601 via public API 605. In particular, public API 605 may offer one or more API commands that client 602 may use for submitting asset binary 604. Public API 605 may use metadata module 606 to generate and store a checksum of asset binary 604. Public API 605 may also use metadata module 606 to store one or more key identifiers (e.g., keyId). Public API may interact with authorization module 611 to authenticate client 602 (e.g., vendor) and obtain a vendor identifier (e.g., vendorId). The vendor identifier may correspond to a cluster identifier on a one-to-one basis.

Public API 605 may use keys module 608 to retrieve various keys (e.g., CEKs) and key identifiers (e.g., keyId) based on a vendor identifier (e.g., vendorId). Keys module 608 may be a service that integrates with local vault agent

609. Keys module 608 may interact with vault agent 609 to retrieve various keys (e.g., CMKs) and also decrypt CEKs. Vault agent 609 may authenticate with key storage 610. Key storage 610 may also be referred to as an external security store. Vault agent 609 and key storage 610 may be external services relative to service platform 601. That is, vault agent 609 and key storage 610 may be services provided by a third-party. Vault agent 609 may be installed locally and integrated with keys module 608. Alternatively, vault agent 609 and key storage 610 may be part of service platform 601. Using vault agent 609 as a secure proxy, keys module 608 may retrieve and cache CMK and manage CEKs by storing them securely and rotating them as appropriate.

Public API 605 may use storage module 607 to perform object-level encryption of asset binary 604 prior to storing encrypted asset binary 604 at cloud storage 603. Encrypted asset binary 604 stored at cloud storage 603 may be doubly encrypted with SSE (on top of OLE). Encrypted binaries stored in cloud storage 603 may have an additional metadata tag (e.g., metadata tag 612) to facilitate migration to the new encryption scheme (e.g., to OLE) in order to continue to serve production traffic while the existing binaries are encrypted with OLE. For example, metadata tag 612 may indicate whether or not asset binary 604 stored at cloud storage 603 has been encrypted with OLE (symbolized by double padlock icons in FIG. 6). Storage 613 may be local storage that is available to service platform 601 and may be part of or separate from keys module 608. Storage 613 may store one or more CEKs. Storage 613 may also include cache memory for storing one or more latest (e.g., active) CMKs. Optionally, the encryption keys stored in the cache memory may expire after a predetermined time threshold for added security. Storage 613 may also include a database that maps encryption keys with corresponding key identifiers. The database may also store mappings between clusters, CEKs, CMKs, etc. Additionally, the database may store information regarding active status of encryption keys.

Figure 7:
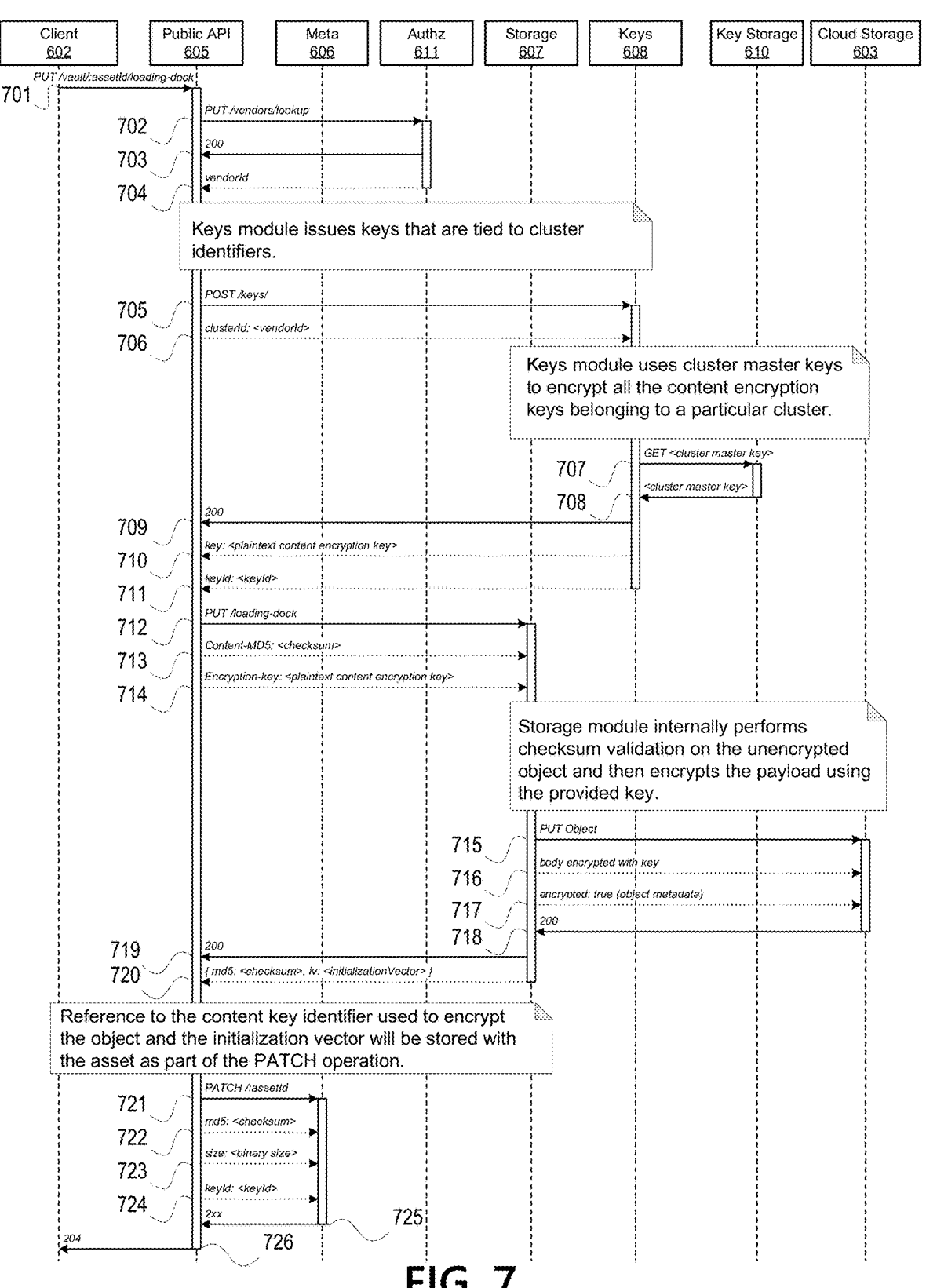
FIG. 7 depicts an example flow diagram of a document upload request flow in accordance with one or more aspects discussed herein.

FIG. 7 depicts an example flow diagram of a document upload request flow. One or more of the steps shown in FIG. 7 may be combined, split up, omitted, and/or performed in different order. In particular, the broken lines indicate steps that may be combined as part of the previous step indicated with a solid line. At step 701, client 602 may send an upload request to public API 605. The upload request may include an asset binary to be uploaded to service platform 601 and its associated asset identifier (e.g., assetId). The upload request message (and one or more subsequent messages) may be a web request/response. The upload request may be, for example, a hypertext transfer protocol (HTTP) PUT method (e.g., PUT/vault/:assetId/loading-dock).

At step 702, public API may send a request (e.g., PUT/vendors/lookup) to authorization module 611 to look up the vendor associated with client 602. Authorization module 611 may optionally authenticate client 602 and look up in a database for the vendor associated with client 602. At step 703, authorization module 611 may send a response to public API 703. For example, the response may include an HTTP 200 OK success response status code in response to the message from step 702. At step 704, authorization module 611 may send a vendor identifier (e.g., vendorId) associated with client 602 to public API 605.

Next, keys module 608 may issue keys that are tied to cluster identifiers and may be responsible for keeping track of how many times a given key has been used for a particular cluster identifier as well as creating a new key once the threshold (e.g., encryption limit) has been reached. At step 705, public API 605 may send a key retrieval request (e.g., POST/keys/) to keys module 608. At step 706, public API 605 may send a cluster identifier (e.g., clusterId) that corresponds to the vendor identifier (e.g., vendorId) associated with client 602.

Keys module 608 may use cluster master keys to encrypt all the content encryption keys belonging to a particular cluster. Keys module 608 may aggressively cache responses from key storage 610. Thus, if keys module 608 already has in its cache the appropriate CMK and/or CEK needed, keys module 608 may use those cached key(s) instead of having to retrieve a key from key storage 610. Otherwise, at step 707, keys module 608 may send a CMK retrieval request (e.g., GET <cluster master key>) to key storage 610. Keys module 608 may use the cluster identifier to identify the appropriate CMK (e.g., active CMK) that is needed for that cluster. The request may be sent to key storage 610 via vault agent 609. At step 708, key storage 610 may send a response message back to keys module 608. The response message may include the current active cluster master key of the cluster. At step 709, keys module 608 may send a response message to public API 605. For example, the response may include an HTTP 200 OK success response status code in response to the message from step 705. At step 710, keys module 608 may send a key to public API 605. The key may be an unencrypted (e.g., plaintext) CEK. Keys module 608 may first decrypt the active CEK of the cluster with the retrieved CMK and then send the decrypted (e.g., plaintext) active CEK to public API 605. At step 711, keys module 608 may send a key identifier (e.g., keyId) to public API 605. The key identifier may correspond to the CEK sent at step 710.

At step 712, public API 605 may send a storage request (e.g., PUT/loading-dock) to storage module 607. At step 713, public API 605 may send a checksum (e.g., Content-MD5: <checksum>) to storage module 607. The checksum may be generated by public API 605 based on the asset binary received at step 701. Alternatively, the checksum may have been generated by client 602 and sent to public API 605 by client 602. The checksum may be, for example, an MD5 checksum value. At step 714, public API 605 may send an encryption key to storage module 607. The encryption key may be the plaintext (e.g., decrypted, unencrypted) CEK that was previously received at step 710.

Storage module 607 may perform checksum validation on the unencrypted object (e.g., asset binary) and then encrypt the payload (e.g., perform OLE on the asset binary) using the provided key. Separating key management (handled by keys module 608) from storage module 607 may increase the efficiency of the service platform. Keeping encryption and decryption of asset binaries in storage module 607 may improve performance by limiting the number of network hops that require transmission of the object to be stored.

At step 715, storage module 607 may send an upload request (e.g., PUT Object) to cloud storage 603. At step 716, storage module 607 may send to cloud storage 603 a message body (e.g., payload) encrypted with the CEK. The message body may include the encrypted asset binary. At step 717, storage module 607 may send an object metadata to cloud storage 603. The object metadata may indicate that the payload has been encrypted (e.g., encrypted: true (object metadata)). At step 718, cloud storage 603 may send a response message to storage module 607. For example, the response may include an HTTP 200 OK success response status code in response to the message from step 715. Cloud storage 603 may additionally apply SSE to the received message body. The asset binary stored on cloud storage 603 may thus be doubly encrypted through OLE and SSE.

At step 719, storage module 607 may send a response message to public API 605. For example, the response may include an HTTP 200 OK success response status code in response to the message from step 712. At step 720, storage module 607 may send a checksum and an initialization vector to public API 605.

In addition to any existing metadata, a reference to the content key identifier used to encrypt the object and the initialization vector may be stored with the asset. For example, at step 721, public API 605 may send a request (e.g., PATCH/:AssetId) to metadata module 606. At step 722, public API 605 may send the checksum (e.g., md5: <checksum>) to metadata module 606. At step 723, public API 605 may send size information (e.g., size: <binary size>). The size information may indicate the size of the asset binary. At step 724, public API 605 may send the key identifier (e.g., keyId: <keyId>) to metadata module 606. In return, at step 725, metadata module 606 may send a response to public API 605. For example, the response may include an HTTP response status code (e.g., 200 OK, 201 Created, 202 Accepted, etc.) in response to the message from step 721. Finally, at step 726, public API 605 may send a response to client 602. For example, the response may include an HTTP 204 No Content success response status code in response to the message from step 701.

Figure 8:
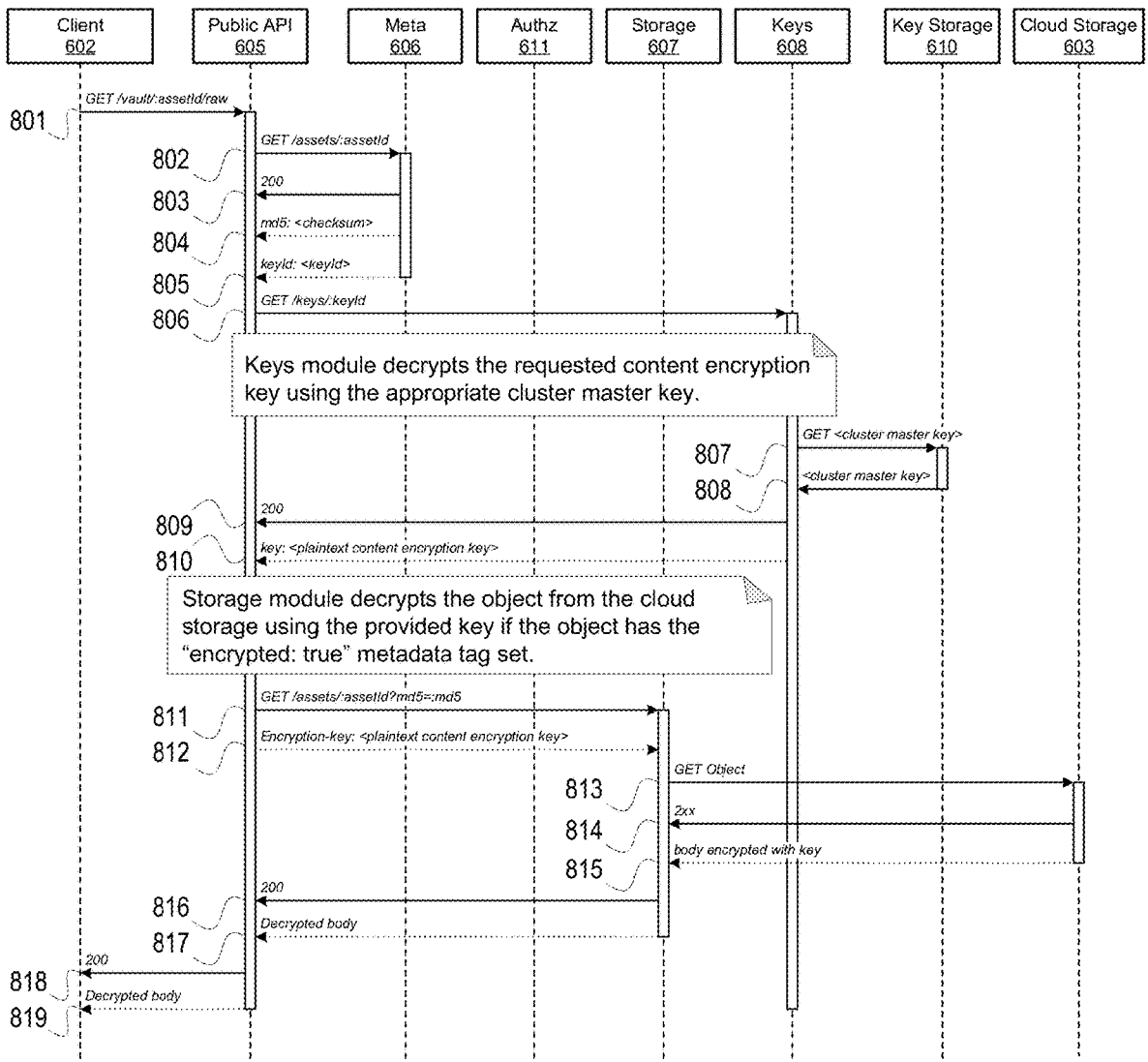
FIG. 8 depicts an example flow diagram of a document download request flow in accordance with one or more aspects discussed herein.

FIG. 8 depicts an example flow diagram of a document download request flow. One or more of the steps shown in FIG. 8 may be combined, split up, omitted, and/or performed in different order. In particular, the broken lines indicate steps that may be combined as part of the previous step indicated with a solid line. At step 801, client 602 may send a download request to public API 605. The download request may include an asset binary identifier (e.g., assetId) associated with the asset binary to be downloaded. The download request message (and one or more subsequent messages) may be a web request/response. The download request may be, for example, a hypertext transfer protocol (HTTP) GET method (e.g., GET/vault/:assetId/raw). Although not shown in FIG. 8, public API 605 may authenticate client 602 similar to steps 702-704 of FIG. 7.

At step 802, public API 605 may send a metadata retrieval request (e.g., GET/assets/:assetId) to metadata module 606. The request may include the asset binary identifier as obtained in step 801. In return, at step 803, metadata module 606 may send a response message to public API 605. For example, the response may include an HTTP 200 OK success response status code in response to the message from step 802. At step 804, metadata module 606 may send the checksum (e.g., md5: <checksum>) associated with the asset binary identifier to public API 605. At step 805, metadata module 606 may send the key identifier (e.g., keyId: <keyId>) associated with the asset binary identifier to public API 605. The key identifier may be associated with the appropriate CEK (e.g., CEK that was used to encrypt the asset binary).

At step 806, public API 605 may send a key retrieval request (e.g., GET/keys/:keyId) to keys module 608. The key retrieval request may include the key identifier previously obtained at step 805. Keys module 608 may decrypt the requested CEK (identified by keyId) using the appropriate CMK from key storage 610. As before, keys module 608 may cache the key(s) aggressively. Thus, if keys module 608 already has in its cache the appropriate CMK and/or CEK needed, keys module 608 may use those cached key(s) instead of having to retrieve a key from key storage 610. Otherwise, at step 807, keys module 608 may send a CMK retrieval request (e.g., GET <cluster master key>) to key storage 610. Keys module 608 may use the key identifier to identify the appropriate CMK (e.g., active CMK) that is needed for the requested binary. The request may be sent to key storage 610 via vault agent 609. At step 808, key storage 610 may send a response message back to keys module 608. The response message may include the appropriate CMK corresponding to the requested binary. At step 809, keys module 608 may send a response message to public API 605. For example, the response may include an HTTP 200 OK success response status code in response to the message from step 806. At step 810, keys module 608 may send a key to public API 605. The key may be a plaintext CEK corresponding to the key identifier previously received at step 806. Keys module 608 may first decrypt the CEK with the CMK retrieved from key storage 610 and then send the decrypted (e.g., plaintext) CEK to public API 605.

At step 811, public API 605 may send an object retrieval request (e.g., GET/assets/:assetId?md5=: md5) to storage module 607. The request may include the relevant asset binary identifier and the checksum as previously obtained at steps 801 and 804 respectively. At step 812, public API 605 may send the encryption key to storage module 607. The encryption key may be the plaintext (e.g., unencrypted, decrypted) CEK obtained at step 810.

At step 813, Storage module 607 may send an object retrieval request (e.g., GET Object) to cloud storage 603. Cloud storage 603 may send a response to storage module 607. For example, the response may include an HTTP response status code (e.g., 200 OK, 201 Created, 202 Accepted, etc.) in response to the message from step 813. At step 815, cloud storage 603 may also send a message body. The message body may include the relevant asset binary that had been previously encrypted with the CEK as identified by the key identifier from step 812. Cloud storage 603 may first remove (e.g., decrypt) SSE from the asset binary before sending it to storage module 607.

At step 816, storage module 607 may send a response message to public API 605. For example, the response may include an HTTP 200 OK success response status code in response to the message from step 811. If the object received from cloud storage 603 has its "encrypted: true" metadata tag set, then storage module 607 may decrypt the object from cloud storage 603 using the CEK received at step 812. At step 817, storage module 607 may send the decrypted message body (e.g., asset binary) to public API 605. At step 818, public API 605 may send a response message to client 602. For example, the response may include an HTTP 200 OK success response status code in response to the message from step 801. At step 819, public API 605 of the service platform may send the decrypted asset binary to client 602.

Figure 9:
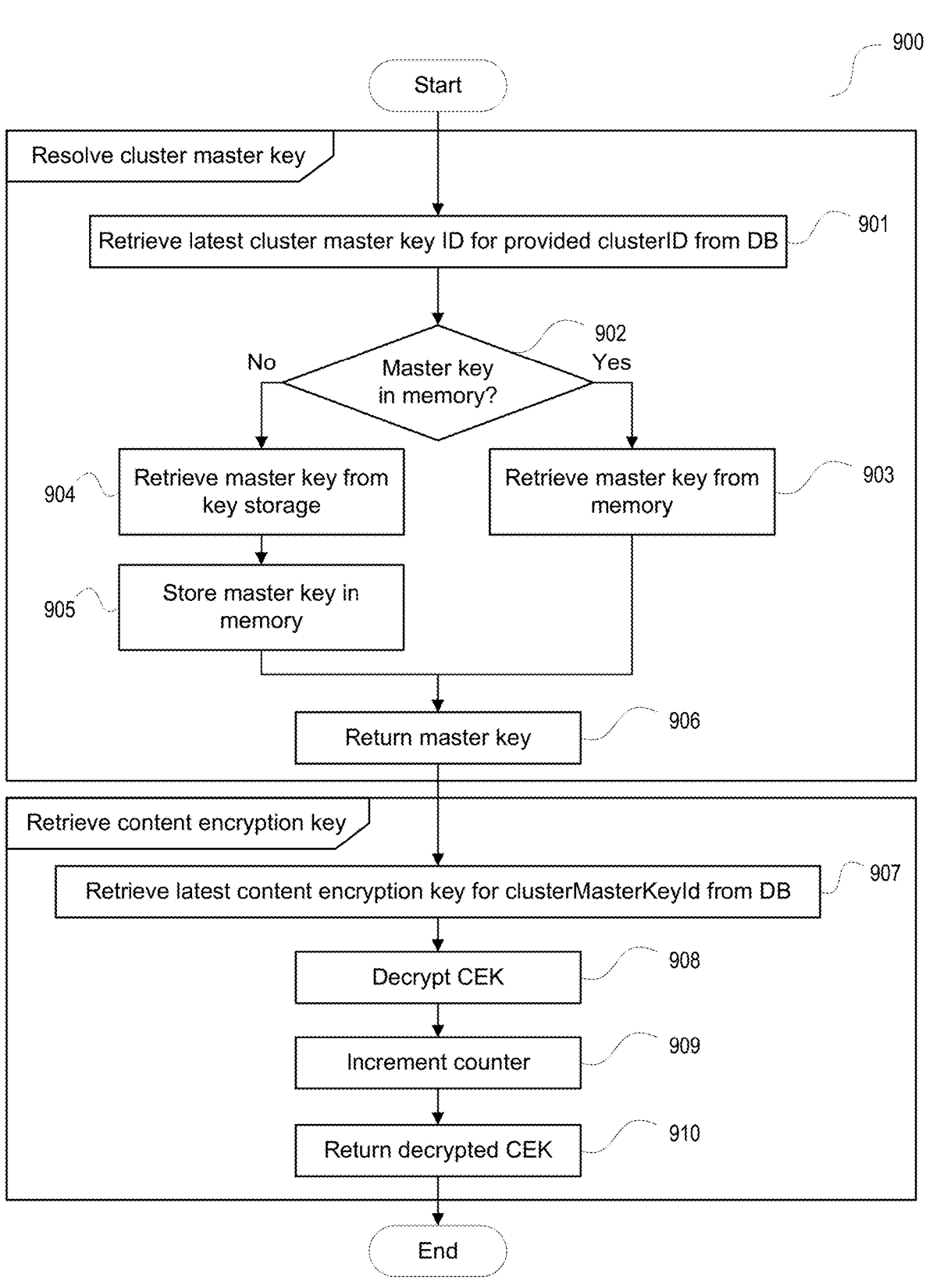
FIG. 9 depicts an example flow diagram of a key retrieval process in accordance with one or more aspects discussed herein.

FIG. 9 depicts an example flow diagram of a key retrieval process. In particular, process 900 may be performed by keys module 608 after the key retrieval request (e.g., POST/keys/) as shown in step 705 of FIG. 7 is received. Keys module 608 may also receive a cluster identifier (e.g., step 706 of FIG. 7). One or more of the steps shown in FIG. 9 may be combined, split up, omitted, and/or performed in different order. Keys module 608 may first resolve the CMK. At step 901, keys module 608 may retrieve from a database a CMK identifier (e.g., masterKeyId) for the latest (e.g., active) cluster master key that is associated with the cluster identified by the cluster identifier. The database may be located either inside or outside keys module 608. At step 902, storage module 610 may determine whether the CMK that corresponds to the CMK identifier is stored in the cache memory. The cache memory may be located either inside or outside keys module 608. If the CMK is stored in the cache memory (902: Yes), then keys module 608 may retrieve the CMK from the cache memory. Otherwise (902: No), keys module 608 may retrieve the appropriate CMK from key storage 610 (e.g., steps 707-708 of FIG. 7). Once retrieved from key storage 610, the CMK may be stored in the cache memory at step 905 for quicker access in the future. At step 906, keys module 608 may return the CMK.

Keys module 608 may then retrieve the appropriate CEK. In particular, at step 907, keys module 608 may retrieve from the database the latest (e.g., active) CEK that is associated with the returned CMK. At step 908, keys module 608 may decrypt the retrieved CEK using the retrieved CMK. Notably, the retrieved CEK may have been previously encrypted with the same CMK. CEK may be encrypted and decrypted by using, for example, the AES-256-CBC algorithm but other encryption algorithms may be used. At step 909, keys module 608 may increment the encryption counter that is associated with the CEK being used. The encryption counter may be used to determine whether the encryption limit for the CEK has been reached thereby requiring a CEK rotation. If a separate encryption counter is maintained for the CMK, the CMK encryption counter may be also increased at this time. At step 910, keys module 608 may return the decrypted CEK. In particular, keys module 608 may send the plaintext (e.g., unencrypted, decrypted) CEK and its associated key identifier to public API 605 (e.g., steps 709-711 of FIG. 7).

Figure 10:
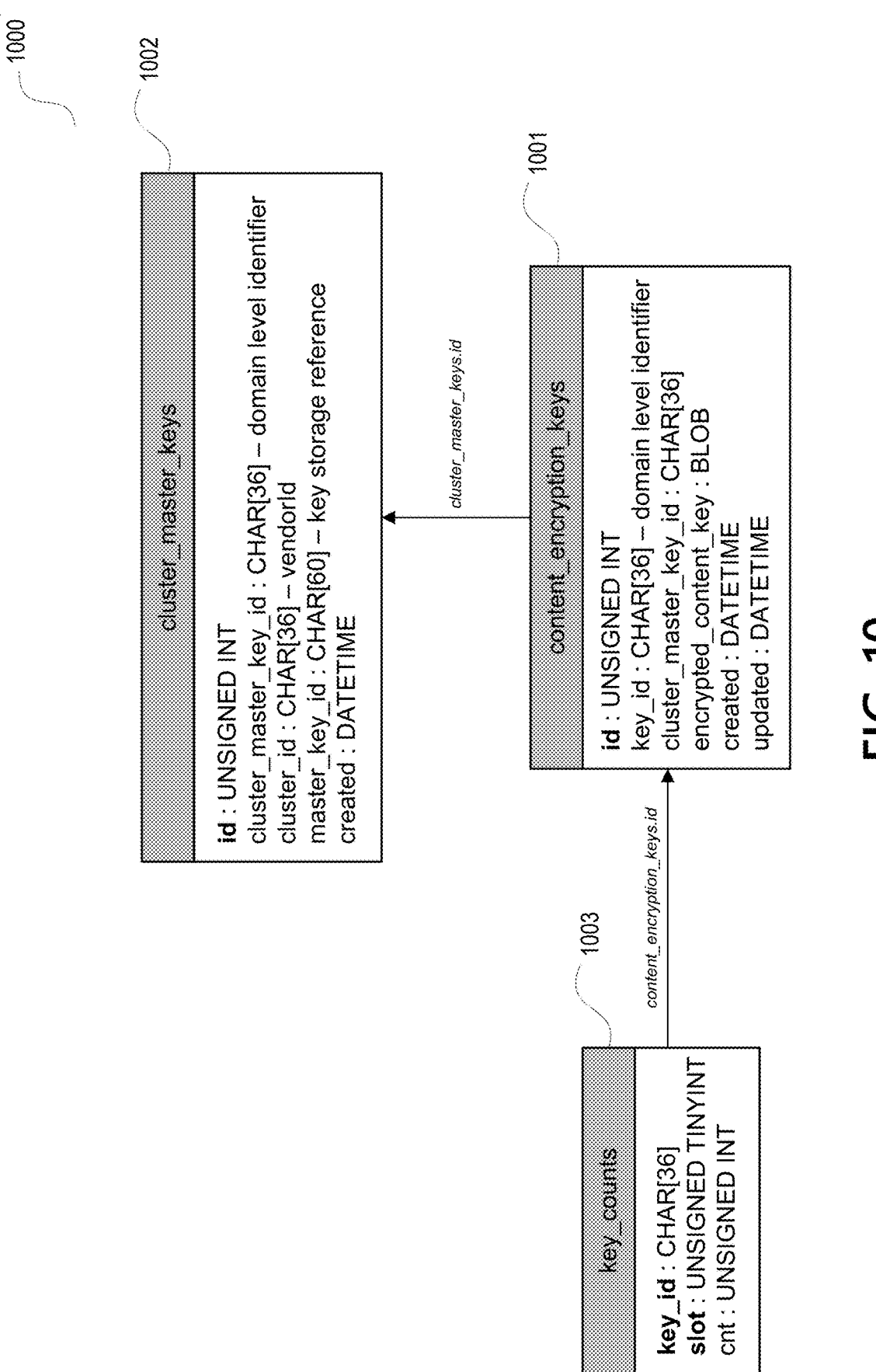
FIG. 10 depicts an example data model for encryption keys and other related information in accordance with one or more aspects discussed herein.

FIG. 10 depicts an example data model for encryption keys and other related information. In data model 1000, various data objects may be stored in a database, such as storage 613 as shown in FIG. 6. Various data objects as shown in FIG. 10 may represent relational database schemas. CEK table 1001 may include various types of information such as one or more key identifiers (e.g., id, key_id, etc.), associated CMK identifier (e.g., cluster_master-_key_id), encrypted CEK value (e.g., encrypted content key), one or more timestamps (e.g., created, updated), etc. The bolded fields in FIG. 10 may indicate primary keys. CEK table 1001 may be linked to its associated CMK table 1002. CMK table 1002 may include various types of information such as one or more key identifiers (e.g., id, cluster_master_key_id, master_key_id), cluster identifier (e.g., cluster_id), one or more timestamps (e.g., created), etc. The cluster identifier may be associated with a corresponding vendor identifier. Optionally, the cluster identifier and the vendor identifier may be interchangeable. The relevant CMK may be associated with multiple key identifiers such as a domain level identifier, a key storage reference, etc. CEK table 1001 may be also linked to encryption counter table 1003 (e.g., key_counts). Encryption counter table 1003 may hold the counts for each CEK generated. Encryption counter table 1003 may include various types of information including a CEK identifier (e.g., key_id), a slot (e.g., slot), and a counter (e.g., cnt). The CEK identifier and the slot may be used as primary keys to distribute the updates and prevent encryption counter table 1003 object from becoming a mutex. Increased concurrency may be thereby achieved.

FIGS. 11A and 11B depict example database queries for updating and retrieving encryption counts. For example, FIG. 11A shows an example query that may be executed to perform an insert with an ON DUPLICATE KEY UPDATE clause to set the new count for the appropriate slot. The slot may be created if it does not already exist, thus removing the need to pre-generate rows for each slot. If the slot already exists, then the count (e.g., cnt) may be updated (e.g., incremented by 1). FIG. 11B shows an example query that may be executed for generating a report for the number of asset binaries encrypted with active CEKs.

Figure 12:
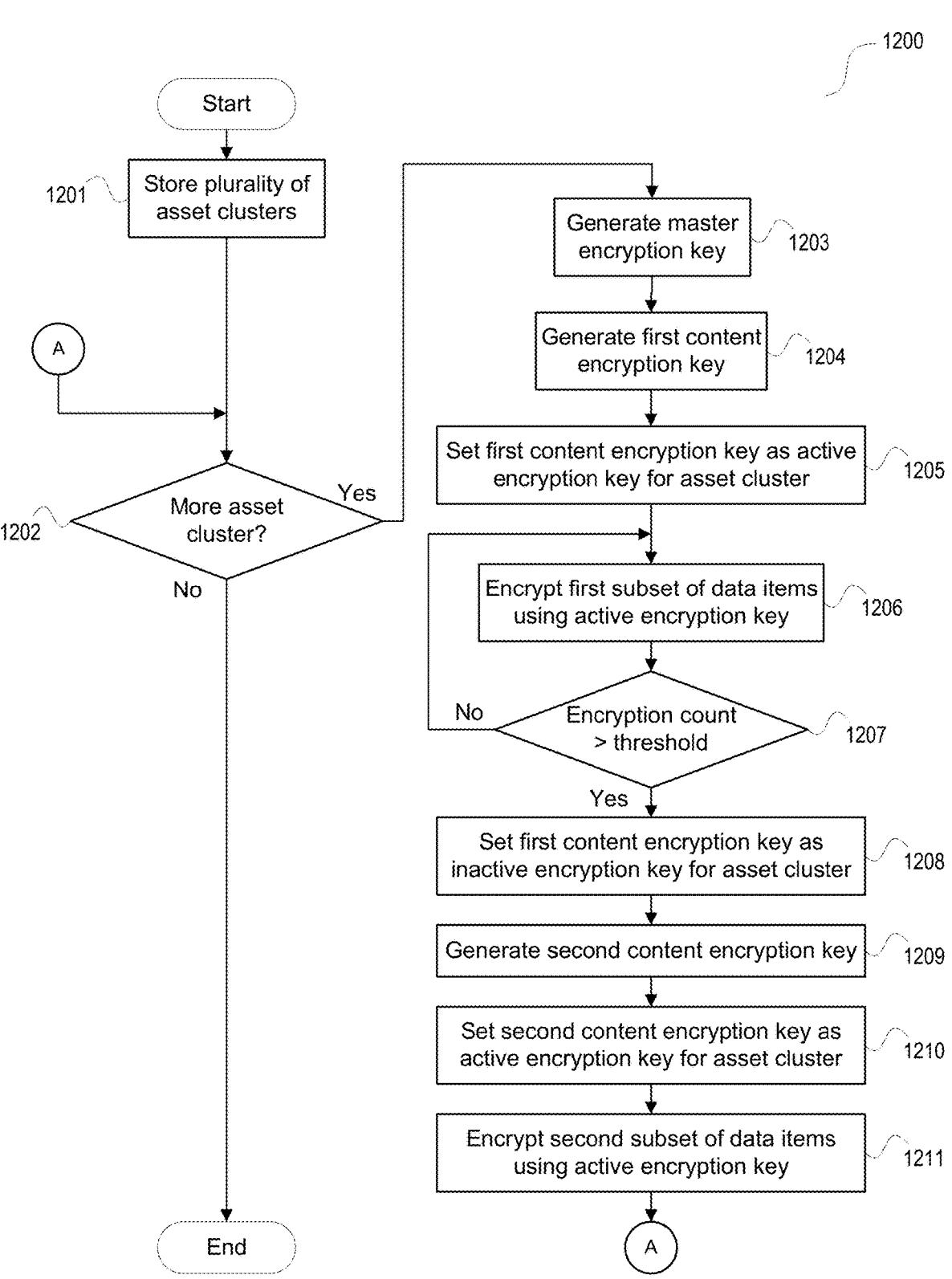
FIG. 12 illustrates an example flow chart for a method and algorithm for object-level encryption and key rotation in accordance with one or more aspects described herein.

FIG. 12 illustrates an example flow chart for a method and algorithm for object-level encryption and key rotation in accordance with one or more aspects described herein. Method 1200 may be implemented by a suitable computing system, as described further herein. For example, method 1200 may be implemented by any suitable computing environment by a computing device and/or combination of computing devices, such as computing devices 101, 105, 107, and 109 of FIG. 1; service platform 204 of FIG. 2; service platform 404 of FIGS. 4A-4D; service platform 501 of FIG. 5; and service platform 601 of FIG. 6. Method 1200 may be implemented in suitable program instructions, such as in machine learning software 127, and may operate on a suitable training set, such as training set data 129. Various steps shown in FIG. 12 may be performed in any order including those that add, omit, combine, and/or split up one or more steps. At step 1201, the system may store a plurality of asset clusters. In particular, the system may store, using a data store, a plurality of asset clusters. Each asset cluster may comprise a plurality of data items and may be associated with an active encryption key. Each asset cluster in the plurality of asset clusters may be associated with a third-party service. At step 1202, the system may, for each asset cluster in the plurality of asset clusters (1202: "more asset cluster? Yes"), perform one or more of steps 1203-1211. Once all the asset clusters are processed (1202: No), the process may end.

At step 1203, the system may generate a master encryption key. Each of the master encryption keys may be stored using an external security store and inaccessible to any third-party services. At step 1204, the system may generate a first content encryption key. In particular, the system may generate the first content encryption key based on the master encryption key for the asset cluster. The first content encryption key may be generated by providing a request indicating an asset cluster in the plurality of asset clusters to the external security store and receiving a response from the external security store. At step 1205, the system may set the first content encryption key associated with the asset cluster as the active encryption key for the asset cluster.

At step 1206, the system may encrypt a first subset of data items using the active encryption key. In particular, the system may encrypt a first subset of the plurality of data items of the asset cluster using the active encryption key. The active encryption key may be the first encryption key. The system may maintain a count of a number (i.e., quantity) of data items encrypted using the active encryption key. At step 1207, the system may determine whether the number of data items encrypted using the active encryption key exceeds a threshold value. Alternatively, at step 1207, the system may determine whether the number of data items encrypted using the active encryption key has reached the threshold value rather than exceeds the threshold value.

If it is determined that the number of data items encrypted using the active encryption key does not exceed the threshold value (1207: No), then the process may return to step 120 and encrypt any additional data items using the active encryption key. Alternatively, the process may return to step 1202 to process the next asset cluster. If it is determined that the number of data items encrypted using the active encryption key exceeds the threshold value (1207: Yes), then at step 1208, the system may set the first content encryption key as an inactive encryption key for the asset cluster.

At step 1209, the system may generate a second content encryption key. In particular, the system may generate the second content encryption key for the asset cluster and based on the master encryption key for the asset cluster. The second content encryption key may be generated by providing a request indicating an asset cluster in the plurality of asset clusters to the external security store and receiving a response from the external security store. At step 1210, the system may set the second content encryption key as the (new) active encryption key for the asset cluster. At step 1211, the system may encrypt a second subset of data items using the active encryption key. In particular, for a second subset of the plurality of data items in the asset cluster, the system may encrypt the second subset of the plurality of data items using the active encryption key (e.g., the second content encryption key). The system may maintain a second count of the number of data items encrypted using the active encryption key (e.g., the second content encryption key).

The system may decrypt, based on generating the second content encryption key; each of the first subset of data items for the asset cluster using the inactive encryption key. The system may encrypt each of the first subset of data items for the asset cluster using the active encryption key.

The system may reset, based on decrypting each of the first subset of data items, the inactive encryption key to a default value. The system may then delete the first content encryption key.

The system may determine that a threshold time period has elapsed. The system may set the second content encryption key as an inactive encryption key for the asset cluster. The system may generate, for the asset cluster and based on the master encryption key for the asset cluster, a third content encryption key. The system may set the third content encryption key as the active encryption key for the asset cluster.

The system may obtain, from a computing device, a request for a data item. The system may determine an asset cluster in the plurality of asset clusters storing the data item. The system may determine a content encryption key that was used to encrypt the data item. The content encryption key may be the first content encryption key for the determined asset cluster and/or the second content encryption key for the determined asset cluster. The system may decrypt the data item using the determined content encryption key. The system may transmit the decrypted data item to the computing device.

The system may generate a second master encryption key for each asset cluster. For each asset cluster in the plurality of asset clusters, the system may decrypting the active encryption key for the asset cluster using the master encryption key for the asset cluster; encrypt the active encryption key for the asset cluster using the second master encryption key for the asset cluster; decrypt the inactive encryption key for the asset cluster using the master encryption key for the asset cluster; and encrypt the inactive encryption key for the asset cluster using the second master encryption key for the asset cluster. The system may delete the master encryption key for each asset cluster.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied, in whole or in part, in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:

retrieving, based on determining that a master encryption key, associated with a plurality of data items, is not stored in a memory of a first computing device, the master encryption key from a second computing device outside the first computing device;

storing the master encryption key in the memory of the first computing device;

decrypting, based on the master encryption key stored in the memory of the first computing device, a first content encryption key;

incrementing, based on the first content encryption key being decrypted, an encryption counter associated with the first content encryption key;

encrypting, using the first content encryption key as an active encryption key, a first subset of the plurality of data items;

based on the encryption counter, which indicates a number of times that the first content encryption key has been decrypted, exceeding a threshold value of the encryption counter, generating, for the plurality of data items, a second content encryption key that is based on the master encryption key;

encrypting, using the second content encryption key as the active encryption key, a second subset of the plurality of data items;

decrypting, using the first content encryption key as an inactive encryption key, each data item in the first subset of the plurality of data items;

encrypting, using the second content encryption key as the active encryption key, each data item, in the first subset of the plurality of data items, that is decrypted using the first content encryption key as the inactive encryption key;

based on a determination that a threshold time period has elapsed after the first subset of the plurality of data items are decrypted using the first content encryption key, setting the second content encryption key as the inactive encryption key for the plurality of data items;

generating, for the plurality of data items, a third content encryption key that is based on the master encryption key; and setting the third content encryption key as the active encryption key for the plurality of data items.

2. The computer-implemented method of claim 1, further comprising:

based on the decrypting each of the first subset of the plurality of data items, deleting the first content encryption key.

3. The computer-implemented method of claim 1, wherein the plurality of data items are associated with a third-party service.

4. The computer-implemented method of claim 1, wherein the master encryption key is stored in an external security store and is inaccessible to any third-party services, and wherein the generating the second content encryption key comprises:

sending, to the external security store, a request for the second content encryption key, wherein the request indicates the plurality of data items; and receiving, from the external security store, a response to the request.

5. The computer-implemented method of claim 1, further comprising:

receiving, from a computing device, a request for a data item;

determining that the second content encryption key has been used to encrypt the data item;

decrypting the data item using the second content encryption key; and sending the decrypted data item to the computing device.

6. The computer-implemented method of claim 1, wherein the master encryption key is a first master encryption key, and wherein the method further comprises:

generating a second master encryption key for the plurality of data items;

decrypting, using the first master encryption key, the second content encryption key;

encrypting, using the second master encryption key, the second content encryption key;

decrypting, using the first master encryption key, the first content encryption key; and encrypting, using the second master encryption key, the first content encryption key; and deleting the first master encryption key.

7. The computer-implemented method of claim 1, further comprising:

storing, using a data store, a plurality of asset clusters, wherein an asset cluster of the plurality of asset clusters comprises the plurality of data items;

generating the master encryption key;

generating, based on the master encryption key, the first content encryption key; and setting the first content encryption key as the active encryption key for the asset cluster.

8. The computer-implemented method of claim 1, further comprising, based on the encryption counter exceeding the threshold value:

setting the first content encryption key as the inactive encryption key for the plurality of data items; and setting the second content encryption key as the active encryption key for the plurality of data items.

9. An apparatus comprising:

one or more processors; and memory storing instructions that, when executed by the one or more processors, cause the apparatus to:

retrieve, based on determining that a master encryption key, associated with a plurality of data items, is not stored in the memory, the master encryption key from a computing device outside the apparatus;

store the master encryption key in the memory of the apparatus;

decrypt, based on the master encryption key stored in the memory of the apparatus, a first content encryption key;

increment, based on the first content encryption key being decrypted, an encryption counter associated with the first content encryption key;

encrypt, using the first content encryption key as an active encryption key, a first subset of the plurality of data items;

based on the encryption counter, which indicates a number of times that the first content encryption key has been decrypted, exceeding a threshold value of the encryption counter, generate, for the plurality of data items, a second content encryption key that is based on the master encryption key;

encrypt, using the second content encryption key as the active encryption key, a second subset of the plurality of data items;

decrypt, using the first content encryption key as an inactive encryption key, each data item, in the first subset of the plurality of data items;

encrypt, using the second content encryption key as the active encryption key, each data item, in the first subset of the plurality of data items, that is decrypted using the first content encryption key as the inactive encryption key;

based on a determination that a threshold time period has elapsed after the first subset of the plurality of data items are decrypted using the first content encryption key, set the second content encryption key as the inactive encryption key for the plurality of data items;

generate, for the plurality of data items, a third content encryption key that is based on the master encryption key; and set the third content encryption key as the active encryption key for the plurality of data items.

10. The apparatus of claim 9, wherein the instructions, when executed by the one or more processors, further cause the apparatus to:

based on each of the first subset of the plurality of data items being decrypted, delete the first content encryption key.

11. The apparatus of claim 9, wherein the master encryption key is stored in an external security store and is inaccessible to any third-party services, and wherein the instructions, when executed by the one or more processors, cause the apparatus to generate the second content encryption key by:

sending, to the external security store, a request for the second content encryption key, wherein the request indicates the plurality of data items; and receiving, from the external security store, a response to the request.

12. The apparatus of claim 9, wherein the master encryption key is a first master encryption key, and wherein the instructions, when executed by the one or more processors, further cause the apparatus to:

generate a second master encryption key for the plurality of data items;

decrypt, using the first master encryption key, the second content encryption key;

encrypt, using the second master encryption key, the second content encryption key;

decrypt, using the first master encryption key, the first content encryption key; and encrypt, using the second master encryption key, the first content encryption key; and delete the first master encryption key.

13. The apparatus of claim 9, wherein the instructions, when executed by the one or more processors, further cause the apparatus to:

store, using a data store, a plurality of asset clusters, wherein an asset cluster of the plurality of asset clusters comprises the plurality of data items;

generate the master encryption key;

generate, based on the master encryption key, the first content encryption key; and set the first content encryption key as the active encryption key for the asset cluster.

14. A non-transitory machine-readable medium storing instructions that, when executed by one or more processors of a first computing device, cause the first computing device to:

retrieve, based on determining that a master encryption key, associated with a plurality of data items, is not stored in a memory of the first computing device, the master encryption key from a second computing device outside the first computing device;

store the master encryption key in the memory of the first computing device;

decrypt, based on the master encryption key stored in the memory of the first computing device, a first content encryption key;

increment, based on the first content encryption key being decrypted, an encryption counter associated with the first content encryption key;

encrypt, using the first content encryption key as an active encryption key, a first subset of the plurality of data items;

based on the encryption counter, which indicates a number of times that the first content encryption key has been decrypted, exceeding a threshold value of the encryption counter, generate, for the plurality of data items, a second content encryption key that is based on the master encryption key;

encrypt, using the second content encryption key as the active encryption key, a second subset of the plurality of data items;

decrypt, using the first content encryption key as an inactive encryption key, each of the first subset of the plurality of data items;

encrypt, using the second content encryption key as the active encryption key, each of the first subset of the plurality of data items;

based on a determination that a threshold time period has elapsed after the first subset of the plurality of data items are decrypted using the first content encryption key, set the second content encryption key as the inactive encryption key for the plurality of data items;

generate, for the plurality of data items, a third content encryption key that is based on the master encryption key; and set the third content encryption key as the active encryption key for the plurality of data items.

15. The non-transitory machine-readable medium of claim 14, wherein the master encryption key is stored in an external security store and is inaccessible to any third-party services, and wherein the instructions, when executed by the one or more processors, cause the one or more processors to generate the second content encryption key by:

sending, to the external security store, a request for the second content encryption key, wherein the request indicates the plurality of data items; and receiving, from the external security store, a response to the request.

16. The non-transitory machine-readable medium of claim 14, wherein the instructions, when executed by the one or more processors, further cause the one or more processors to:

receive, from a computing device, a request for a data item;

determine that the second content encryption key has been used to encrypt the data item;

decrypt the data item using the second content encryption key; and send the decrypted data item to the computing device.

17. The non-transitory machine-readable medium of claim 14, wherein the master encryption key is a first master encryption key, and wherein the instructions, when executed by the one or more processors, further cause the one or more processors to:

generate a second master encryption key for the plurality of data items;

decrypt, using the first master encryption key, the second content encryption key;

encrypt, using the second master encryption key, the second content encryption key;

decrypt, using the first master encryption key, the first content encryption key; and encrypt, using the second master encryption key, the first content encryption key; and delete the first master encryption key.

* * * * *